United States Patent [19]

Hicks et al.

[11] 4,068,158

[45] Jan. 10, 1978

[54] HIGH EFFICIENCY D.C. VOLTAGE REGULATOR

[75] Inventors: James E. Hicks, Garrett; Joseph G. Zahnen; Werner F. Wedam, both of Fort Wayne, all of Ind.

[73] Assignee: The Magnavox Company, Fort Wayne, Ind.

[21] Appl. No.: 707,987

[22] Filed: July 23, 1976

[51] Int. Cl.² .................................................. G05F 1/56
[52] U.S. Cl. ...................................... 323/17; 307/297; 323/22 T; 323/DIG. 1
[58] Field of Search ............... 321/2; 323/17, 227, 323/23, DIG. 1; 307/296, 297; 363/15, 16, 19, 21

[56] References Cited

U.S. PATENT DOCUMENTS

| 3,235,787 | 2/1966 | Gordon et al. | 323/22 T |
| 3,417,321 | 12/1968 | Clapp | 323/DIG. 1 |
| 3,527,999 | 9/1970 | Weinberger | 323/DIG. 1 |
| 3,566,253 | 2/1971 | O'Neill | 323/DIG. 1 |
| 3,657,572 | 4/1972 | Millman | 323/DIG. 1 |

OTHER PUBLICATIONS

Motorola Pub. Cer. 108, "An Inexpensive Switch Mode Power Supply", 1973.

Primary Examiner—Gerald Goldberg

[57] ABSTRACT

A high efficiency switching regulator for maintaining a constant d.c. voltage is described. An efficiency improvement of better than 20 percent is realized by use of an alternate low impedance current source for supplying base current to the control transistor of a switching regulator.

5 Claims, 4 Drawing Figures

HIGH EFFICIENCY D.C. VOLTAGE REGULATOR

BACKGROUND OF THE INVENTION

This invention relates to the voltage regulator art. Specifically, apparatus is provided for improving the efficiency of a switch mode or switching regulator.

Voltage regulator circuits have been developed for maintaining a constant d.c. voltage supplied to a changing load. Ideally, the voltage regulator should maintain a constant output d.c. voltage for a varying input voltage and a varying load.

Regulator circuits which utilize a series transistor connected between a load and the source of unregulated voltage are well known in the art. A reference voltage is continuously compared with the load voltage and the series transistor is controlled to supply more current when the load voltage is less than the reference voltage. As the load voltage approaches the reference voltage, the series transistor delivers less current.

The series transistor dissipates considerable energy while regulating the load voltage. To reduce this energy consumption, it is possible to operate the series transistor in a switching mode. A switching mode regulator is described in a publication by Motorola Semiconductor Products Inc., No. CER-108, entitled "An Inexpensive Switch Mode Power Supply." The series transistor is forced into full saturation when the load voltage is below a reference voltage, and turned off when the load voltage is substantially equal to the reference voltage. By operating the transistor either fully saturated or turned completely off, the energy consumption of the series regulator transistor is reduced.

The series transistor requires appreciable base current in either type of regulator. The base current is usually supplied by bias resistors. Energy consumption in the bias resistors may be as high as 30 percent of the energy delivered to the load. In order to reduce the amount of energy dissipated by the bias resistors, thereby improving the efficiency of the regulator circuit, an alternate low impedance path for supplying base current is desirable.

SUMMARY OF THE INVENTION

It is an object of this invention to improve the efficiency of a switching regulator.

It is another object of this invention to maintain the base current to a switching transistor in a switching regulator constant over a wide range of input voltages.

These and other objects may be accomplished by the invention described herein. A switching regulator circuit having a transformer with a primary winding in series with the switching transistor is provided with a low impedance source of bias current. The bias current for the transistor is derived by storing energy supplied by the secondary of the transformer with a capacitor or other energy storage means during the nonconducting portion of the switching cycle. The stored energy is transferred to the base of the transistor in the form of a bias current. This additional bias current reduces the current drawn through the bias resistors thereby reducing the energy consumption in the bias resistors.

A more complete understanding of the invention may be had by referring to the figures and the description of the preferred embodiments.

DESCRIPTION OF THE PREFERRED EMBODIMENTS

Figure 1:
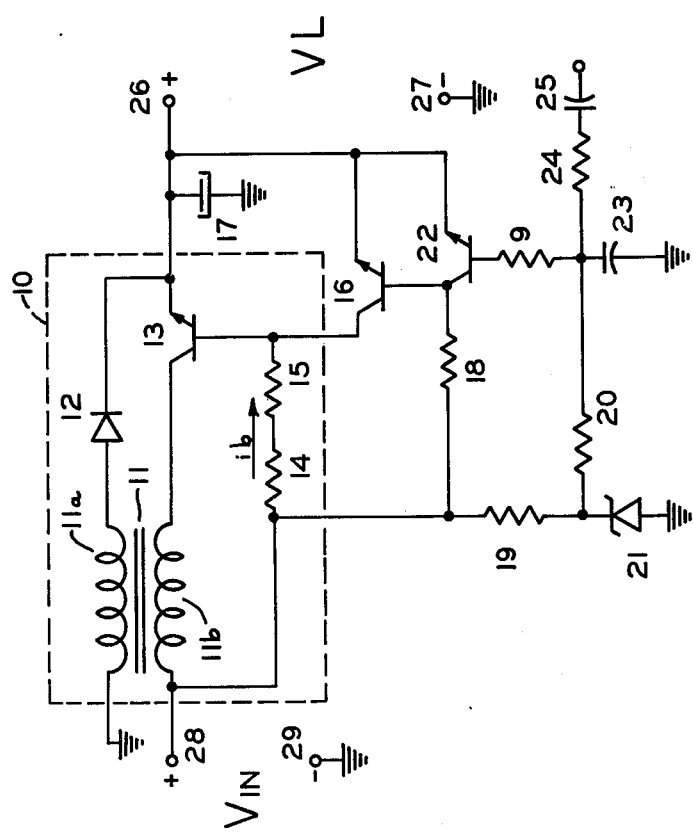
FIG. 1 is a schematic drawing of a switching regulator used in the art.

Referring now to FIG. 1, a known switching regulator is shown. A transistor 13 is used to cyclically connect the input terminal 28 (unregulated d.c. voltage) to the output terminal 26 to provide a regulated d.c. voltage. Transistor 13 is turned either completely on or completely off depending upon the level of voltage detected at terminal 26. When the voltage level at terminal 26 is lower than an established reference, transistor 13 will be turned on causing capacitor 17 to charge to a voltage level substantially at the aforementioned reference voltage.

An inductor is normally placed in series with the control transistor 13 and the source of unregulated voltage. The inductor reduces the current rush thereby protecting the switching transistor 13. In the embodiment shown, a transformer 11 is used to reduce the current rush. A primary winding 11B is connected from the collector of transistor 13 to the input terminal 18. A secondary winding 11A of transformer 11 is connected through a diode 12 to the emitter of transistor 13. The remaining end of the secondary winding 11A is grounded. By using a transformer in the manner shown, the transient associated with the series inductance 11B may be used to improve the efficiency of the switching regulator. When transistor 13 is gated off during the nonconducting portion of the switching cycle, the collapsing magnetic field associated with the primary winding 11B is coupled to the secondary winding 11A. The secondary winding 11A in series with diode 12 produces a d.c. current for charging capacitor 17.

When transistor 13 is conducting, the necessary base current is supplied through resistors 14 and 15. This base current causes considerable energy to be dissipated in resistors 14 and 15, thereby reducing the total efficiency of the switching regulator circuit. The energy consumed by these two resistors 14, 15 can be as much as 30 percent of the power delivered to a load connected to terminals 26 and 27.

Transistor 16 and transistor 22 are used to turn transistor 13 on and off according to the voltage level sensed at terminals 26 and 27. A voltage divider comprising resistor 19 and Zener diode 21 establishes a d.c. reference voltage. Resistor 20 couples the d.c. reference voltage to capacitor 23. Appearing simultaneously on capacitor 23 is an integrated, linearly increasing waveform. The combination d.c. voltage and integrated waveform is applied through resistor 9 to the base of transistor 22. When the base voltage of transistor 22 exceeds the emitter voltage, transistor 22 is caused to turn on thereby turning transistor 16 off. In a similar manner, when the instantaneous base voltage appearing on transistor 22 is less than the voltage appearing at the emitter, transistor 16 is turned on, thereby turning transistor 13 off. In this manner, the switching regulator maintains the voltage at terminals 26 and 27 substantially constant.

The energy dissipated by resistors 14 and 15 as previously mentioned may constitute as much as 30 percent of the energy delivered to a load. This energy consumption may be reduced by the circuitry shown in FIGS. 2 and 3. Section 10 of FIG. 1, illustrating the relevant circuitry which dissipates the aforementioned energy, is replaced by the circuitry of FIG. 2 or FIG. 3.

Figure 2:
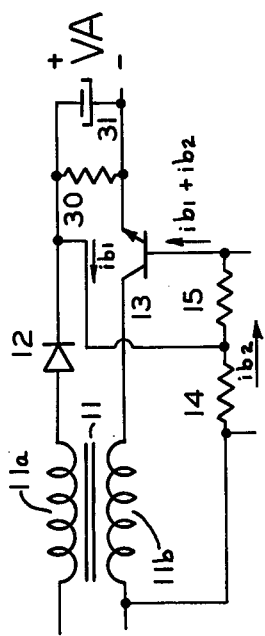
FIG. 2 is a schematic drawing of one embodiment of the invention used to improve the efficiency of the switching regulator of FIG. 1.

Referring now to FIG. 2, the improved efficiency may be realized by providing a second current $ib1$ for biasing transistor 13 on during the conduction portion of the switching cycle. A portion of the energy derived from the collapsing magnetic field surrounding transformer 11 during the nonconducting portion of the switching cycle is stored by the capacitor 31. The diode 12 providing a rectified current from transformer secondary 11a charges capacitor 31 to a voltage VA. Resistor 30 limits the magnitude of voltage VA.

During the conducting portion of the switching cycle, the energy stored on capacitor 31 causes a current $ib1$ to flow into the base of transistor 13. The total base current then consists of $(ib1 + ib2)$. The contribution of $ib1$ by capacitor 31 allows for $ib2$ to be smaller. Reducing $ib2$ by increasing the resistance of resistor 14 reduces the energy consumption of resistor 14 thereby improving the overall circuit efficiency.

Figure 3:
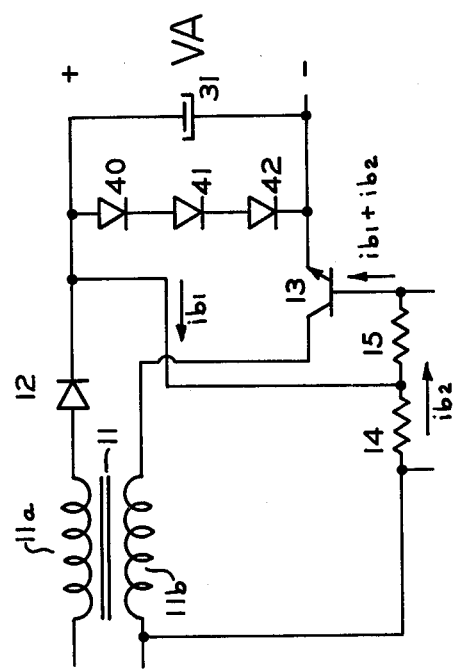
FIG. 3 is a schematic drawing of another embodiment of the invention which may be used to improve the efficiency of the switching regulator of FIG. 1.
Figure 4:
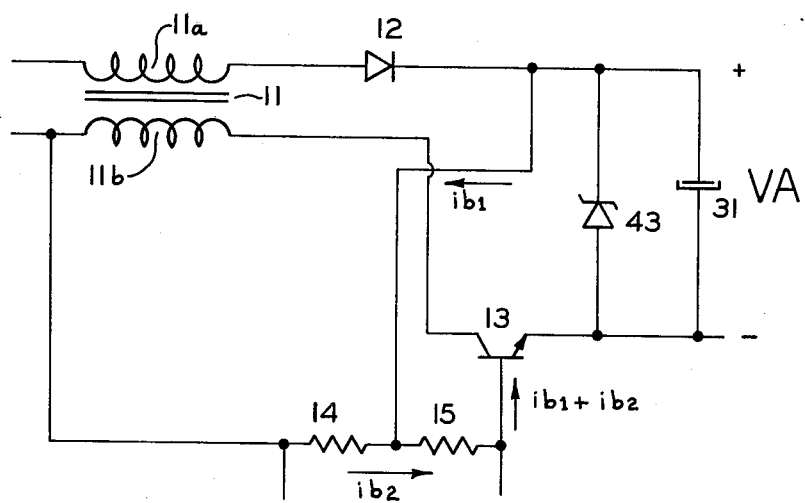
FIG. 4 is a schematic of still another embodiment of the present invention.

FIG. 3 represents a further improvement by establishing the voltage difference VA by using three forward biased diodes 40, 41, and 42 in series. These diodes establish a constant voltage VA sufficient to provide an additional current path for enabling switching transistor 13 into a conducting state and consume less energy than resistor 30 of FIG. 2. FIG. 4 illustrates other means for establishing a voltage VA may be used, such as Zener diodes. The base current in this embodiment $(ib1 + ib2)$ results in a further reduction of energy consumption over the circuit described in FIG. 2 and FIG. 1.

With the use of circuitry shown in FIGS. 2 and 3, the resistance of resistor 14 may be increased approximately five times over that shown in FIG. 1. The purpose of resistor 14 in FIGS. 2 and 3 is merely to provide a "starting" current when the switching regulator is initially energized. It has been found experimentally, that the circuit shown in FIG. 2 can produce under certain input conditions a dissipation of approximately 10 percent of the load power, and the circuit shown in FIG. 3 can produce a dissipation of approximately 7.5 percent of the load power. Both of these embodiments shown provide a desirable saving of energy. The circuit shown in FIG. 3 has an additional advantage. The voltage VA is always the same notwithstanding large variations in the line voltage or input voltage appearing at terminals 28 and 29. Therefore, the base current drive for transistor 13 is essentially constant for changing values of input voltages appearing at terminal 28 and 29. In the prior art circuit shown in FIG. 1, the base drive for transistor 13 changes considerably for the different range of input voltages experienced at terminals 28 and 29. The variation in base drive is somewhat less in the circuit of FIG. 2.

Thus there is described with reference to two embodiments a circuit for improving the efficiency of a switching regulator. Those skilled in the art will recognize that other modifications and equivalent circuits may be made without departing from the scope of the invention described more particularly by the claims that follow.

What is claimed is:

1. An improved switch mode regulator for supplying a regulated voltage from a source of unregulated voltage to an external load impedance of the type having a transformer with a primary and secondary winding, said primary winding being connected in series with said source of unregulated voltage; a transistor having a collector, emitter and a base, said collector and emitter being serially connected with said primary winding and said load impedance; means for coupling energy induced in said secondary winding to said external load impedance; and means for periodically foward biasing the base-emitter junction of said transistor in response to variations of said regulated voltage with respect to a reference voltage, wherein the improvement comprises:
   a. means for storing a portion of the energy supplied by said secondary winding during periods when said transistor is nonconducting; and
   b. means for supplying a portion of said stored energy in the form of electrical current to the base of said transistor when said transistor is conducting.

2. The apparatus of claim 1 wherein said means for storing energy comprises:
   a. a capacitor in series with said means for coupling energy induced in said secondary winding and said load impedance; and
   b. means for limiting the voltage across said capacitor.

3. The apparatus of claim 2 wherein said means for limiting said capacitor voltage is a resistor in parallel with said capacitor.

4. The apparatus of claim 2 wherein said means for limiting said capacitor voltage is a series combination of a plurality of diodes, said series combination being connected in parallel with said capacitor.

5. The apparatus of claim 2 wherein said means for limiting said capacitor voltage is a Zener diode connected in parallel with said capacitor.

* * * * *